US012787126B2

(12) United States Patent
Zhou et al.

(10) Patent No.: US 12,787,126 B2
(45) Date of Patent: Nov. 3, 2026

(54) HEATING ELEMENT, HEATING DEVICE, AND HEAT-NOT-BURN CIGARETTE

(71) Applicant: SHENZHEN SMOORE TECHNOLOGY LIMITED, Shenzhen (CN)

(72) Inventors: Hongming Zhou, Shenzhen (CN); Hong Li, Shenzhen (CN); Huanxi Li, Shenzhen (CN); Rihong Li, Shenzhen (CN); Zhenqian Cheng, Shenzhen (CN); Yurong Liu, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 476 days.

(21) Appl. No.: 18/463,414

(22) Filed: Sep. 8, 2023

(65) Prior Publication Data

US 2023/0422354 A1 Dec. 28, 2023

Related U.S. Application Data

(63) Continuation of application No. PCT/CN2022/077221, filed on Feb. 22, 2022.

(30) Foreign Application Priority Data

Mar. 12, 2021 (CN) ......................... 202120529718.5

(51) Int. Cl.
*A24F 40/46* (2020.01)
*H05B 3/22* (2006.01)

(52) U.S. Cl.
CPC ............... *H05B 3/22* (2013.01); *A24F 40/46* (2020.01)

(58) Field of Classification Search
CPC .......... A24F 40/46; A24F 40/20; A24F 40/10; A24F 40/00
See application file for complete search history.

(56) References Cited

U.S. PATENT DOCUMENTS

| | | | | |
|---|---|---|---|---|
| 2015/0163859 A1* | 6/2015 | Schneider | ............ | H05B 3/0014 219/535 |
| 2018/0007971 A1* | 1/2018 | Plojoux | ................... | A24F 40/46 |
| 2019/0269174 A1* | 9/2019 | Robert | ..................... | H05B 3/04 |

(Continued)

FOREIGN PATENT DOCUMENTS

| | | |
|---|---|---|
| CN | 102595943 B | 5/2015 |
| CN | 104470387 B | 6/2016 |

(Continued)

OTHER PUBLICATIONS

Patent Cooperation Treaty, International Search Report and Written Opinion, International Application No. PCT/CN2022/077221 (Apr. 24, 2022).

*Primary Examiner* — Alex B Efta
(74) *Attorney, Agent, or Firm* — Leydig, Voit & Mayer, Ltd.

(57) ABSTRACT

A heating element includes: a conductive substrate; an insulating layer located on the conductive substrate; a heating layer located on the insulating layer and electrically connected to the conductive substrate; a first conductive member located on the insulating layer and electrically connected to the heating layer; and a second conductive member located on the conductive substrate and electrically connected to the conductive substrate.

16 Claims, 6 Drawing Sheets

(56) References Cited

U.S. PATENT DOCUMENTS

| | | | | |
|---|---|---|---|---|
| 2020/0163386 | A1* | 5/2020 | Courbat .................. | A24F 40/50 |
| 2022/0279853 | A1* | 9/2022 | Huang .................... | A24F 40/70 |

FOREIGN PATENT DOCUMENTS

| | | | |
|---|---|---|---|
| CN | 208096015 | U | 11/2018 |
| CN | 109793282 | A | 5/2019 |
| CN | 111296895 | A | 6/2020 |
| CN | 112137172 | A | 12/2020 |
| CN | 215347054 | U | 12/2021 |
| KR | 1020210011831 | A | 2/2021 |
| WO | 2021036727 | A1 | 3/2021 |

* cited by examiner

HEATING ELEMENT, HEATING DEVICE, AND HEAT-NOT-BURN CIGARETTE

CROSS-REFERENCE TO PRIOR APPLICATION

This application is a continuation of International Patent Application No. PCT/CN2022/077221, filed on Feb. 22, 2022, which claims priority to Chinese Patent Application No. 202120529718.5, filed on Mar. 12, 2021. The entire disclosure of both applications is hereby incorporated by reference herein.

FIELD

The present disclosure relates to the field of heating technologies, and in particular, to a heating element, a heating device, and a heat-not-burn cigarette.

BACKGROUND

New tobacco products are tobacco products that contain tobacco or can produce smoke and flavor, bring people the pleasure of suction, and satisfy physiological needs, but do not belong to other categories such as cigarettes, roll-your-own cigarette cigarettes, pipe tobacco, hookahs, cigars, cigarillos, chewing tobacco, snuff, and oral tobacco products. It is generally believed that the new tobacco products mainly include electronic cigarettes, low-temperature cigarettes (that is, heat-not-burn tobacco products), and the like. The new tobacco products are electronic products that serve as a substitute for cigarettes, and have a similar appearance, smoke, taste, and feel to the cigarettes. Compared with the cigarettes, harmful ingredients of the new tobacco products are reduced by more than 90%, and therefore the new tobacco products are favored by more and more people.

The new tobacco products can be divided into a heat-not-burn (HNB) cigarette and a vapor e-cigarette according to different smoke emission manners. The HNB cigarette is to heat the tobacco through a heating element to make the tobacco emit an aroma of flue-cured tobacco without burning the tobacco. However, the current HNB cigarette has a poor uniformity of the emitted aroma and taste.

SUMMARY

In an embodiment, the present invention provides a heating element, comprising: a conductive substrate; an insulating layer located on the conductive substrate; a heating layer located on the insulating layer and electrically connected to the conductive substrate; a first conductive member located on the insulating layer and electrically connected to the heating layer; and a second conductive member located on the conductive substrate and electrically connected to the conductive substrate.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
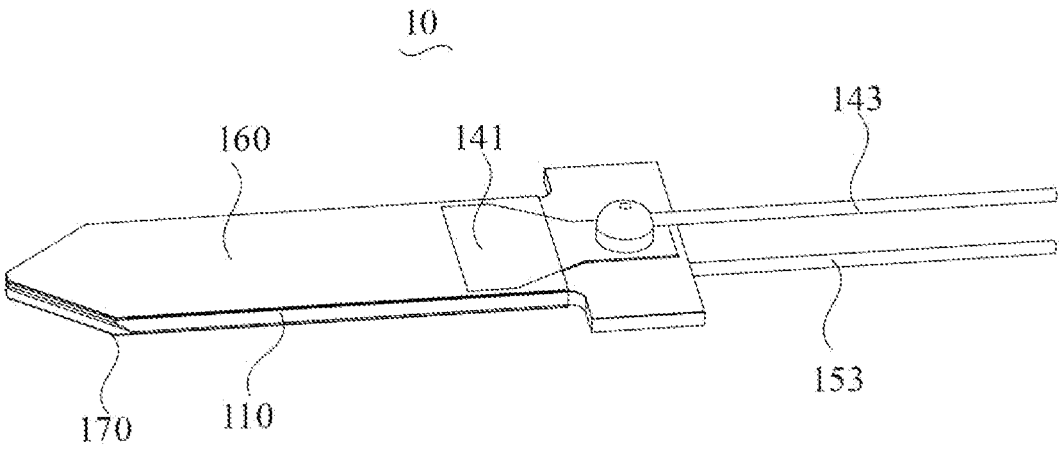
FIG. 1 is a perspective view of a heating element according to an embodiment of this application.

In an embodiment, the present invention provides a heating element with good heating uniformity, a heating device having the heating element, and a heat-not-burn cigarette.

In an embodiment, the present invention provides a heating element. The heating element may include: a conductive substrate; an insulating layer, located on the conductive substrate; a heating layer, located on the insulating layer and electrically connected to the conductive substrate; a first conductive member, located on the insulating layer and electrically connected to the heating layer; and a second conductive member, located on the conductive substrate and electrically connected to the conductive substrate.

In an embodiment, a resistance of the conductive substrate may be in a range of 0.6Ω to 2Ω.

In an embodiment, the conductive substrate may be in the shape of a sheet; the conductive substrate has a first surface, a second surface opposite to the first surface, a first end, and a second end opposite to the first end; the insulating layer is located on the first surface and covers a part of the first surface; one part of the heating layer may be attached to a part of the first surface not covered by the insulating layer, the part of the heating layer may be farther away from the first end of the conductive substrate than the other part of the heating layer, the other part of the heating layer may be attached to the insulating layer and is electrically connected to the first conductive member, and the first conductive member may be adjacent to the first end; and the second conductive member is located on the second surface and adjacent to the first end.

In an embodiment, the conductive substrate may has a strip-shaped sheet structure; the first conductive member may include a first conductive layer, and the first conductive layer may be located on the insulating layer and is electrically connected to the heating layer; and the second conductive member may include a second conductive layer, the second conductive layer may be located on the second surface and adjacent to the first end, and the second conductive layer may be electrically connected to the conductive substrate.

In an embodiment, a width of the first conductive layer is 1 mm to 5 mm narrower than a width of the conductive substrate.

In an embodiment, a length of the first conductive layer in a length direction of the conductive substrate is in a range of 5 mm to 10 mm.

In an embodiment, the first conductive layer may include gold and/or gold alloy and/or silver and/or silver alloy.

In an embodiment, a width of the second conductive layer may be 1 mm to 5 mm narrower than the width of the conductive substrate.

In an embodiment, the second conductive layer may include gold and/or gold alloy and/or silver and/or silver alloy.

In an embodiment, a length of the second conductive layer in the length direction of the conductive substrate is in a range of 5 mm to 10 mm.

In an embodiment, the conductive substrate may be in the shape of a column having a tip, the conductive substrate may have a bottom end surface and an outer circumferential surface, the insulating layer is located on the outer circumferential surface and covers a part of the outer circumferential surface, one part of the heating layer may be connected to a part of the outer circumferential surface not covered by the insulating layer, the part of the heating layer may be farther away from the bottom end surface than the other part of the heating layer, the other part of the heating layer may be located on the insulating layer and is electrically connected to the first conductive member, the first conductive member may be adjacent to the bottom end surface, and the second conductive member may be located on the outer circumferential surface and adjacent to the bottom end surface.

In an embodiment, the first conductive member may include a first conductive layer and a first snap ring, the first conductive layer is located on the insulating layer and is electrically connected to the heating layer; and the first snap ring may be sleeved on the first conductive layer and is electrically connected to the first conductive layer, the second conductive member may include a second snap ring, and the second snap ring may be fixed to the outer circumferential surface and is electrically connected to the conductive substrate.

In an embodiment, a length of the first conductive layer in a length direction of the conductive substrate is in a range of 2 mm to 3 mm.

In an embodiment, a distance between one side of the first conductive layer adjacent to the bottom end surface and the bottom end surface may be in a range of 2 mm to 3 mm.

In an embodiment, the first conductive layer may include gold and/or gold alloy and/or silver and/or silver alloy.

In an embodiment, a distance between one side of the insulating layer adjacent to the bottom end surface and the bottom end surface may be in a range of 2 mm to 5 mm.

In an embodiment, a distance between one side of the heating layer adjacent to the bottom end surface and the bottom end surface may be in a range of 4 mm to 10 mm.

In an embodiment, the heating element may further include a covering layer covering the heating layer and/or a protective layer covering at least part of the conductive substrate.

In an embodiment, a material of the conductive substrate may be selected from at least one of a metal, a semiconductor, and a conductive ceramic.

In an embodiment, a material of the heating layer may be selected from at least one of titanium, tin oxide, and nickel.

In an embodiment, the covering layer and/or the protective layer may be a ceramic layer.

According to another aspect of the present disclosure, a heating device is provided. The heating device includes the heating element and a mounting base, where the heating element is mounted to the mounting base.

In an embodiment, the heating device is configured as a heat-not-burn cigarette device.

According to still another aspect of the present disclosure, a heat-not-burn cigarette is provided. The heat-not-burn cigarette includes the heating element or the heating device as described above.

10. Heating element 110. Conductive substrate; 111. First surface; 113. Second surface; 115: First end; 120. Insulating layer; 130. Heating layer; 140. First conductive member; 141. First conductive layer; 143. First lead; 150. Second conductive member; 151 Second conductive layer; 153. Second lead; 160. Covering layer; 170. Protective layer;

20. Heating element; 210. Conductive substrate; 211. Outer circumferential surface; 215. Bottom end surface; 220. Insulating layer; 230. Heating layer; 240. First conductive member; 241. First conductive layer; 242. First snap ring; 243. First lead; 250. Second conductive member; 251. Second snap ring; 253. Second lead; 260. Covering layer.

To help understand the present disclosure, the following describes the present disclosure more comprehensively with reference to the related accompanying drawings. The accompanying drawings show some embodiments of the present disclosure. However, the present disclosure may be implemented in many different forms, and is not limited to the embodiments described in this specification. On the contrary, the embodiments are provided to make the disclosed content of the present disclosure clearer and more comprehensive.

It should be noted that when a component is referred to as "being fixed to" the other component, the component may be directly on the other component, or an intermediate component may be present. When an element is considered to be "connected to" the other element, the element may be directly connected to the other element, or an intervening element may be also present. The terms "vertical", "horizontal", "upper", "lower", "left", "right", and similar expressions used in this specification are only for purposes of illustration but not indicate a unique implementation.

Unless otherwise defined, meanings of all technical and scientific terms used in this specification are the same as that usually understood by a person skilled in the technical field to which the present disclosure belongs. In this specification, terms used in this specification of the present disclosure are merely intended to describe objectives of the specific embodiments, but are not intended to limit the present disclosure.

Figure 2:
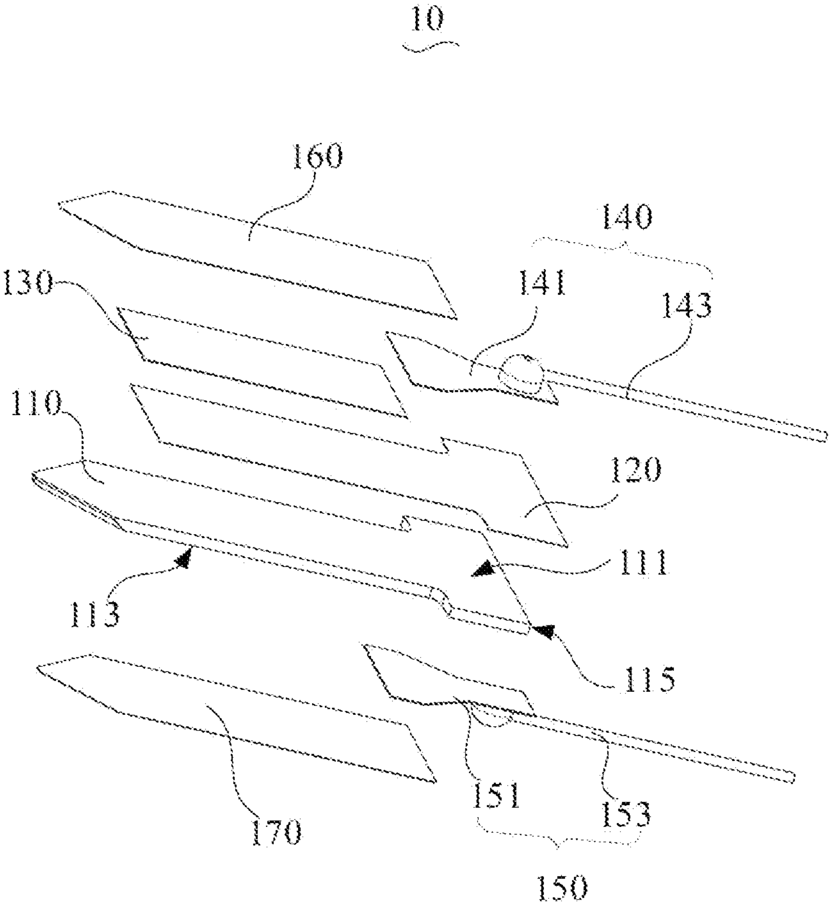
FIG. 2 is an exploded perspective view of the heating element shown in FIG. 1.

Referring to FIG. 1 and FIG. 2, a heating element 10 is provided according to an embodiment of the present disclosure. The heating element 10 is substantially in the shape of a sheet, and includes a conductive substrate 110, an insulating layer 120 located on the conductive substrate 110, a heating layer 130 located on the insulating layer 120 and electrically connected to the conductive substrate 110, a first conductive member 140 located on the insulating layer 120 and electrically connected to the heating layer 130, and a second conductive member 150 located on the conductive substrate 110 and electrically connected to the conductive substrate 110.

The conductive substrate 110 serves as a support member of other components of the foregoing heating element 10, and further serves as a conductive member connecting the heating layer 130 to the second conductive member 150, so that a power supply can form a current circuit with the first conductive member 140, the heating layer 130, the conductive substrate 110, and the second conductive member 150. Specifically, two poles of the power supply may be electrically connected to the first conductive member 140 and the second conductive member 150 respectively, so that when the power supply is turned on, the current circuit is formed between the power supply and the first conductive member 140, the heating layer 130, the conductive substrate 110, and the second conductive member 150.

In this implementation, the conductive substrate 110 is in the shape of a sheet. The conductive substrate 110 has a first surface 111, a second surface 113 opposite to the first surface 111, a first end 115, and a second end opposite to the first end 115. As shown in FIG. 1 and FIG. 2, the second end may correspond to a tip of the conductive substrate 110. Further, the conductive substrate 110 may be in the shape of a strip-shaped sheet. In the embodiments shown in FIG. 1 and FIG. 2, the conductive substrate 110 is in the shape of a T-shaped sheet. The conductive substrate 110 is arranged to be in the shape of the T-shaped sheet to facilitate the mounting and fixation of the heating element 10.

Optionally, a material of the conductive substrate 110 is selected from at least one of a metal, a semiconductor, and a conductive ceramic.

Certainly, the material of the conductive substrate 110 is not limited to the above, but can also be other materials that can conduct electricity and can serve as a substrate. Further, in some embodiments, a resistance of the conductive substrate 110 is 0.6Ω to 2Ω. By setting the resistance of the conductive substrate 110 to 0.6Ω to 2Ω, the conductive substrate 110 can heat while conducting electricity, so that the conductive substrate 110 of the heating element 10 and the heating layer 130 can heat at the same time, and a response speed of heating is improved. In an exemplary embodiment, the resistance of the conductive substrate 110 is 0.8Ω to 1.5Ω. The material of the conductive substrate 110 is any one or more of a metal titanium, a titanium alloy, a metal nickel, a nickel alloy, a metal silver, a silver an alloy, a metal copper, a copper alloy, and a semiconductor heating film.

The insulating layer 120 is configured to space a part of the heating layer 130 from the conductive substrate 110 to increase an effective area of the heating layer 130. Specifically, the insulating layer 120 is attached to a first surface 111 and covers a part of the first surface 111. In the embodiments shown in FIG. 1 and FIG. 2, the insulating layer 120 is substantially in the shape of a T-shaped sheet. It may be understood that in other embodiments, the shape of the insulating layer 120 is not limited to the above, and may also be adjusted according to an actual situation. It should be noted that the material of the insulating layer 120 is not particularly limited, as long as the material can act as insulation.

Figure 3:
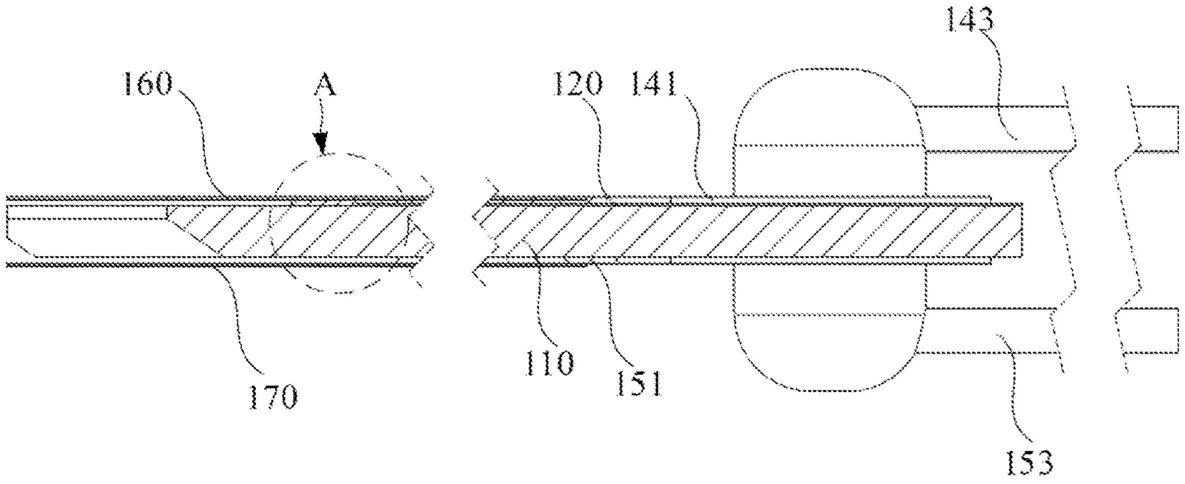
FIG. 3 is a longitudinal cross-sectional view of disconnected parts of the heating element shown in FIG. 1.
Figure 4:
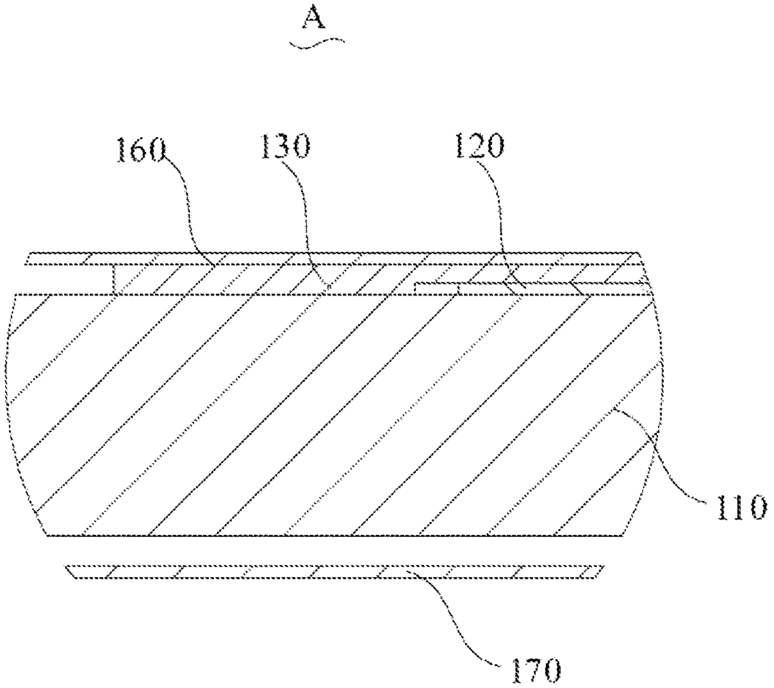
FIG. 4 is a partial enlarged view of A in FIG. 3.

The heating layer 130 is configured to heat. Referring to FIG. 3 and FIG. 4, the heating layer 130 is in the shape of a sheet, a part of the heating layer 130 is attached to the first surface 111 not covered by the insulating layer 120, and a connection part between the heating layer 130 and the first surface 111 is located on a side of the insulating layer 120 away from the first end 115. That is to say, the part of the heating layer is farther away from the first end of the conductive substrate 110 than the other part of the heating layer, while the other part of the heating layer 130 is attached to the insulating layer 120 and is electrically connected to the first conductive member 140, and the first conductive member is adjacent to the first end, so that the heating layer 130 can be electrically connected to the conductive substrate 110 and the first conductive member 140.

Optionally, a material of the heating layer 130 is selected from at least one of titanium, tin oxide, and nickel. Certainly, the material of heating layer 130 is not limited to the above, but may also be other materials that can be used as heating layer 130.

The first conductive member 140 is configured to connect the heating layer 130 and the power supply, and the first conductive member 140 is adjacent to the first end 115. Specifically, the first conductive member 140 includes a first conductive layer 141. The first conductive layer 141 is located on the insulating layer 120 and is electrically connected to the heating layer 130. Optionally, a width of the first conductive layer 141 is 1 mm to 5 mm narrower than a width of the conductive substrate 110. A short circuit can be avoided according to such settings. Optionally, a length of the first conductive layer 141 in a length direction of the conductive substrate 110 is in a range of 5 mm to 10 mm. In an illustrated implementation, the width of the first conductive layer 141 decreases gradually in a direction extending from the heating layer 130 toward the first end 115. It should be noted that the width of the first conductive layer 141 herein refers to a width of the first conductive layer 141 in a width direction of the conductive substrate 110.

Optionally, the first conductive layer 141 includes silver and/or a silver alloy. In an embodiment, the first conductive layer 141 is formed as a silver layer or a silver alloy layer. Certainly, in other embodiments, a material of the first conductive layer 141 may further include gold or a gold-containing alloy or other conductive material. It should be noted that the first conductive layer 141 may be formed of a single conductive material, or may be formed of two or more conductive materials. That is to say, the material of the first conductive layer 141 may include gold and/or gold alloy and/or silver and/or silver alloy.

In some embodiments, the first conductive member 140 further includes a first lead 143, and the first lead 143 is welded to the first conductive layer 141. In the illustrated embodiment, the first lead 143 is adjacent to the first end 115. Certainly, in other embodiments, other electrically conductive elements may be used in place of the first lead 143 or the first lead 143 may be omitted, for example, by structural design. The first lead 143 is soldered to the first conductive layer 141 before use so that the first conductive layer 141 can be electrically connected to the power supply.

The second conductive member 150 is configured to connect the conductive substrate 110 and the power supply; and the second conductive member 150 and the first conductive member 140 are located on opposite sides of the conductive substrate 110. Specifically, the second conductive member 150 is located on the second surface 113 and adjacent to the first end 115. Optionally, a width of the second conductive layer 151 is 1 mm to 5 mm narrower than a width of the conductive substrate 110. A short circuit can be avoided according to such settings. Optionally, a length of the second conductive layer 151 in a length direction of the conductive substrate 110 is in a range of 5 mm to 10 mm. In an illustrated implementation, the width of the second conductive layer 151 decreases gradually along a direction of the heating layer 130 toward the first end 115.

It should be noted that the width of the second conductive layer 151 herein refers to a width of the second conductive layer 151 in a width direction of the conductive substrate 110.

Optionally, the second conductive layer 151 includes silver and/or a silver alloy. In an embodiment, the second conductive layer 151 is formed as a silver layer or a silver alloy layer. Certainly, in other embodiments, a material of the second conductive layer 151 may further include gold or a gold-containing alloy or other conductive material. It should be noted that the second conductive layer 151 may be formed of a single conductive material, or may be formed of two or more conductive materials. That is to say, the material of the second conductive layer 151 may include gold and/or gold alloy and/or silver and/or silver alloy.

In some embodiments, the second conductive member 150 further includes a second lead 153, and the second lead 153 is welded to the second conductive layer 151. In the illustrated embodiment, the leads are adjacent to the first end 115. Certainly, in other embodiments, other electrically conductive elements may be used in place of the second lead 153 or the second lead 153 may be omitted, for example, by structural design. The second lead 153 is soldered to the second conductive layer 151 before use so that the second conductive layer 151 can be electrically connected to the power supply.

In at least one embodiment, the first conductive member 140 and the second conductive member 150 are arranged on opposite sides of the conductive substrate 110. Orthographic projections of the first conductive member 140 and the second conductive member 150 on the conductive substrate 110 may or may not overlap. For example, sizes and shapes of the first conductive member 140 and the second conductive member 150 may or may not be identical. In a further embodiment, the first lead 143 and the second lead 153 may be staggered to increase a distance between the two leads and avoid a short circuit.

In some embodiments, the heating element 10 further includes a covering layer 160 covering the heating layer 130. The covering layer 160 is configured to protect the heating layer 130 and prevent an e-liquid from penetrating and contacting the heating layer 130 during a suction process and causing corrosion of the heating layer 130. Optionally, the covering layer 160 is a ceramic layer. In an example, the covering layer 160 is a glass-ceramic layer. Certainly, in other embodiments, a material of the covering layer 160 is not limited to the glass ceramic. In the illustrated embodiment, the covering layer 160 covers all the heating layer 130 and covers a part of the first conductive layer 141. In this case, the covering layer 160 may also protect that part of the first conductive layer 141 covered by the covering layer.

In some embodiments, the heating element 10 further includes a protective layer 170 attached to the second surface 113 of the conductive substrate 110, and the protective layer 170 is configured to protect the conductive substrate 110 from corrosion by the e-liquid. In a specific example, the protective layer 170 is a ceramic layer such as a glass-ceramic layer. In the illustrated embodiment, the protective layer 170 further covers a part of the second conductive layer 151. In this case, the protective layer 170 may also protect that part of the second conductive layer 151 covered by the covering layer.

Optionally, the insulating layer 120, the heating layer 130, the first conductive layer 141, and the second conductive layer 151 can all be prepared by PVD deposition or silk screen printing. The insulating layer 120 prepared by the PVD deposition or the silk screen printing is beneficial to control the consistency of a film layer, thereby improving the performance of the prepared heating element 10.

In this implementation, a thickness of the conductive substrate 110 is in a range of mm to 0.01 mm; a thickness of the insulating layer 120 is in a range of 0.001 mm to 0.01 mm; a thickness of the heating layer 130 attached to the conductive substrate 110 is in a range of mm to 0.01 mm, a thickness of the heating layer 130 attached to the insulating layer 120 is in a range of 0.001 mm to 0.01 mm, a thickness of the first conductive layer 141 is in a range of mm to 0.01 mm, and a thickness of the second conductive layer 151 is in a range of 0.001 mm to 0.01 mm; and a thickness of the covering layer 160 is in a range of 0.001 mm to 0.01 mm, and a thickness of the protective layer 170 is in a range of 0.001 mm to 0.01 mm. Certainly, in other embodiments, The thicknesses of the conductive substrate 110, the insulating layer 120, the heating layer 130, the first conductive layer 141, the second conductive layer 151, the covering layer 160, and the protective layer 170 are not limited to the above, and may also be adjusted according to an actual situation.

The heating element 10 configures the substrate as the conductive substrate 110, and electrically connects the conductive substrate 110 to the heating layer 130 and the second conductive member 150, so that the first conductive member 140, the heating layer 130, the conductive substrate 110, the second conductive member 150, and the power supply can form a conductive circuit, thereby realizing the heating of a whole surface of the heating layer 130. In this way, an area of a high temperature area is increased, a maximum temperature of the heating element 10 is reduced, an energy consumption is reduced, a heating uniformity of the heating layer 130 is improved, an odor caused by a high temperature baking in a second half of a cigarette suction is reduced, a fragrance and a taste uniformity emitted by the cigarette are improved, and a tobacco utilization rate is improved. Moreover, since the resistance of the conductive substrate 110 is 0.6Ω to 2Ω, the conductive substrate 110 may be used as a heat source while conducting electricity, which improves the uniformity of a temperature field and improves a corresponding speed of heating. In addition, since the first conductive member 140 and the second conductive member 150 are located on opposite sides of the conductive substrate 110, the structural stability of the heating element 10 is improved.

Figure 5:
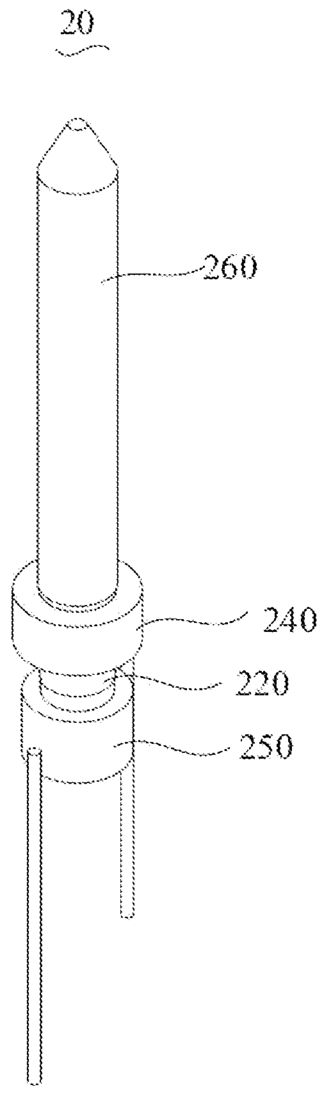
FIG. 5 is a perspective view of a heating element according to another embodiment of this application.
Figure 6:
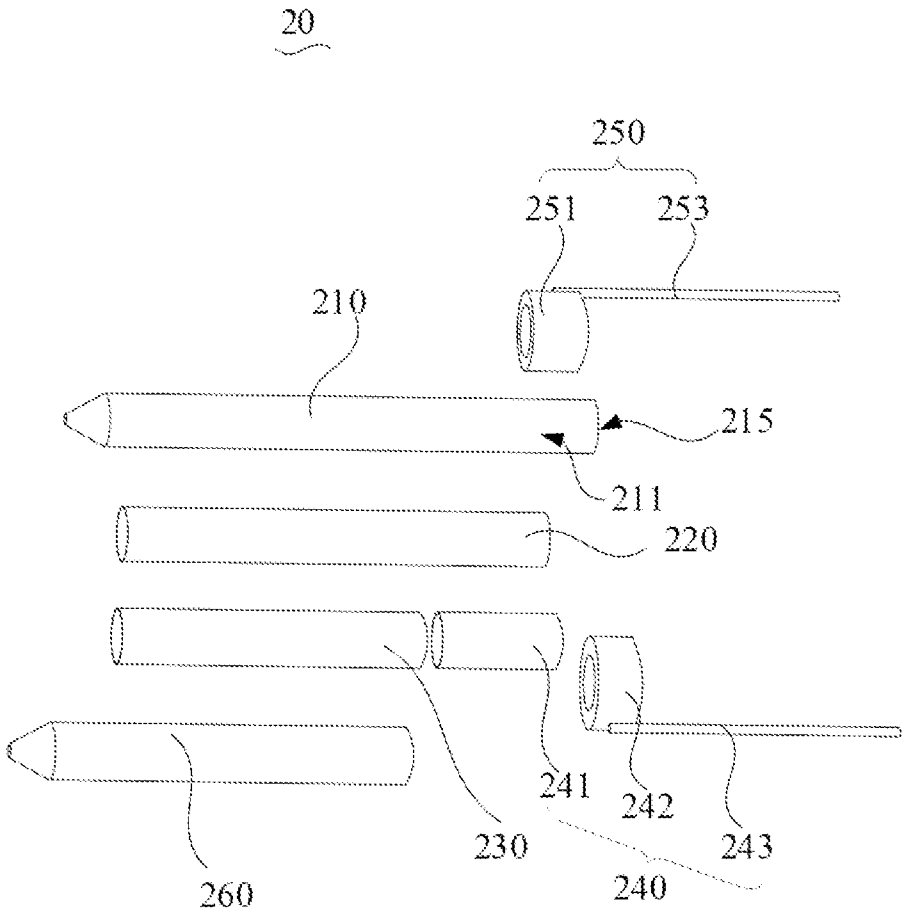
FIG. 6 is an exploded perspective view of the heating element shown in FIG. 5.

Referring to FIG. 5 and FIG. 6, another heating element 20 is further provided according to another embodiment of the present disclosure. The structure of the heating element is substantially the same as that of the heating element 10, except that the heating element 20 is substantially cylindrical (may also be referred to as a needle) having a tip.

Figure 7:
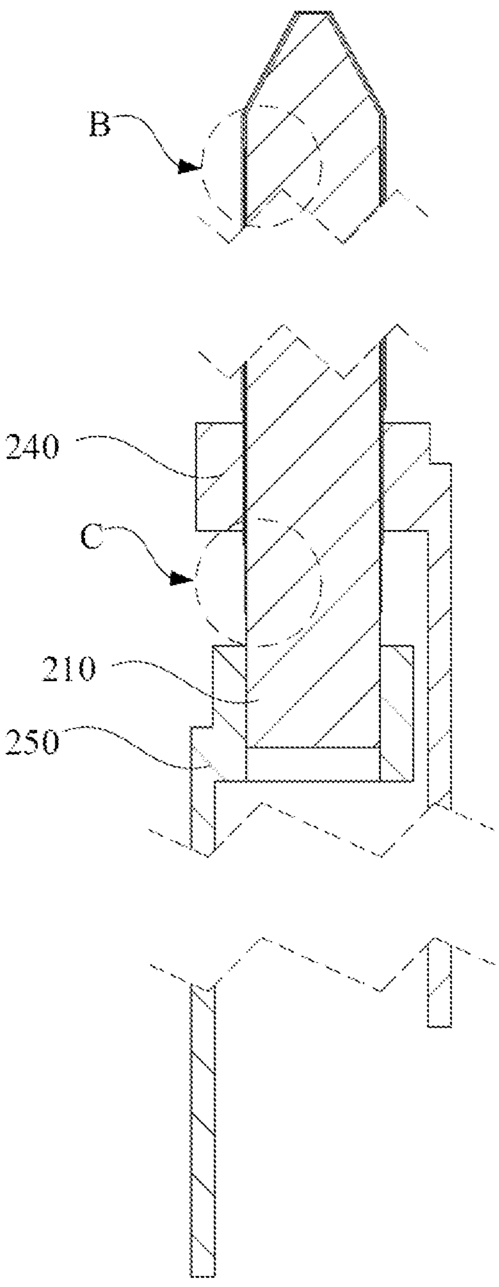
FIG. 7 is a longitudinal cross-sectional view of disconnected parts of the heating element shown in FIG. 5.
Figure 8:
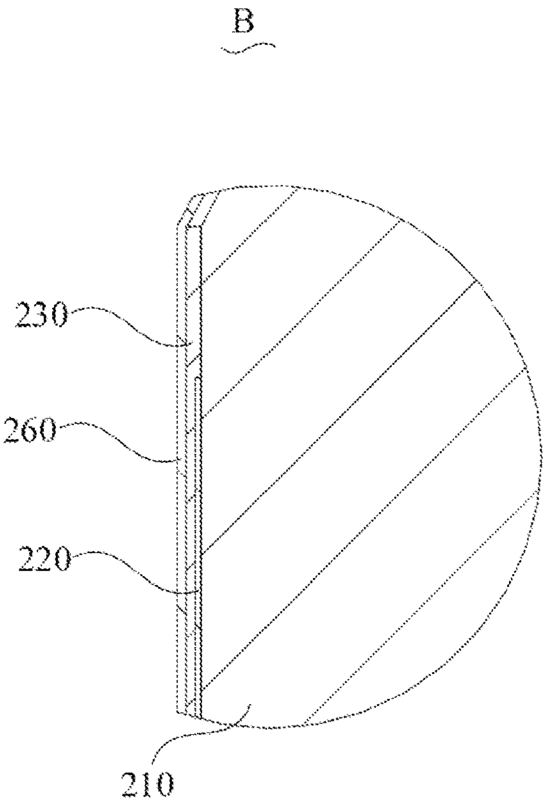
FIG. 8 is a partial enlarged view of B in FIG. 7.
Figure 9:
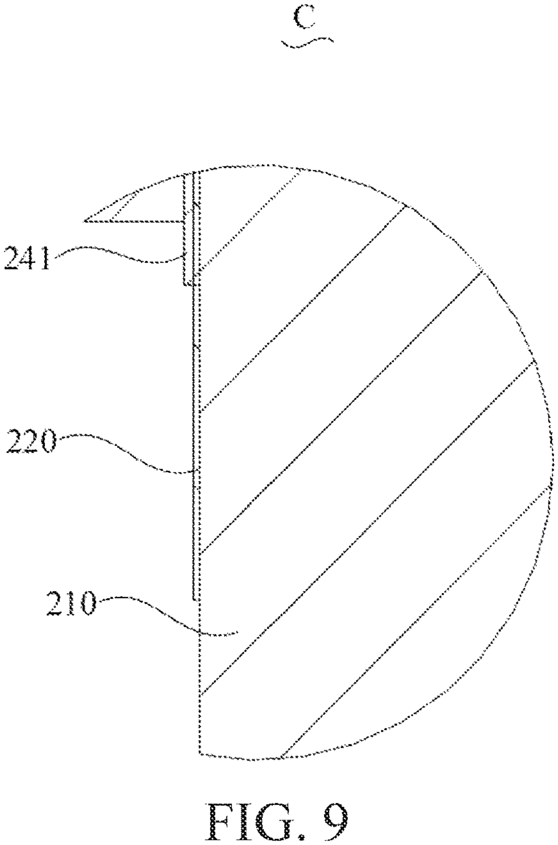
FIG. 9 is a partial enlarged view of C in FIG. 7. In the drawings, reference numerals are as follows.

Referring to FIG. 7 to FIG. 9 together, the heating element 20 includes a conductive substrate 210 in a form of a column having the tip, an insulating layer 220 located on the conductive substrate 210, a heating layer 230 located on the insulating layer 220 and electrically connected to the conductive substrate 210, a first conductive member 240 located on the insulating layer 220 and electrically connected to the heating layer 230, and a second conductive member 250 located on the conductive substrate 210 and electrically connected to the conductive substrate 210.

The conductive substrate 210 has an outer circumferential surface 211 and a bottom end surface 215. The bottom end surface 215 is adjacent to a position at which the conductive substrate is connected to the power supply. The insulating layer 220 is located on the outer circumferential surface 211 and covers a part of the outer circumferential surface 211, a part of the heating layer 230 is in contact with or connected to the part of the outer circumferential surface 211 that is not covered by the insulating layer 220, the part of the heating layer 230 is farther from the bottom end surface 215 than the other part of the heating layer, the other part of the heating layer 230 is located on the insulating layer 220 and is electrically connected to the first conductive member 240, the first conductive member 240 is adjacent to the bottom end surface 215, and the second conductive member 250 is located on the outer circumferential surface 211 and is adjacent to the bottom end surface 215.

In the illustrated embodiment, the insulating layer 220 and the heating layer 230 are both in the shape of a hollow cylinder. The insulating layer 220 is sleeved on the conductive substrate 210 and attached to the outer circumferential surface 211 of the conductive substrate 210, and two ends of the conductive substrate 210 are not covered by the insulating layer 220. The heating layer 230 is sleeved on the conductive substrate 210, one part of the heating layer 230 is attached to the outer circumferential surface 211 not covered by the insulating layer 220, and the other part of the heating layer 230 is attached to the insulating layer 220. That is to say, the part of the heating layer 230 is farther away from the bottom end surface 215 than the other part of the heating layer 230.

Referring to FIG. 5 and FIG. 6, the first conductive member 240 includes a first conductive layer 241 and a first snap ring 242 electrically connected to the first conductive layer 241 and sleeved on the first conductive layer 214, and the first conductive layer 241 is attached to the insulating layer 220 and electrically connected to the heating layer 230. The first snap ring 242 is configured to electrically connect the first conductive layer 241 to the power supply. The second conductive member 250 includes a second snap ring 251, the second snap ring 251 is fixed to the outer circumferential surface 211, and is electrically connected to the conductive substrate 210.

In the illustrated embodiment, the first conductive layer 241 is in the shape of a hollow cylinder, and the first conductive layer 241 is sleeved on the insulating layer 220 and attached to the insulating layer 220 adjacent to the bottom end surface 215. The first conductive member 240 further includes a first lead 243 electrically connected to the first snap ring 242. The second conductive member 250 further includes a second lead 253 electrically connected to the second snap ring 251. The second snap ring 251 is configured to electrically connect the conductive substrate 210 to the power supply. The first snap ring 242 and the second snap ring 251 are further configured to fix the heating element 20. For example, the heating element 20 can be mounted to the mounting base by an engagement of the first snap ring 242 and the second snap ring 251 with the mounting base of the heating device. That is to say, the first snap ring 242 and the second snap ring 251 are not only used for electrical connection, but also for mounting the heating element 20 to the heating device.

Optionally, a length of the first conductive layer 241 in a length direction of the conductive substrate 210 is in a range of 2 mm to 3 mm. Further, a length of the first conductive layer 241 in a length direction of the conductive substrate 210 is in a range of 2.5 mm to 3 mm.

Optionally, a distance between a side of the first conductive layer 241 adjacent to the bottom end surface 215 and the bottom end surface 215 is in a range of 2 mm to 3 mm. Further, a distance between a side of the first conductive layer 241 adjacent to the bottom end surface 215 and the bottom end surface 215 is in a range of 2.5 mm to 3 mm.

Optionally, a distance between a side of the insulating layer 220 adjacent to the bottom end surface 215 and the bottom end surface 215 is in a range of 2 mm to 5 mm. Further, a distance between a side of the insulating layer 220 adjacent to the bottom end surface 215 and the bottom end surface 215 is in a range of 3 mm to 5 mm.

Optionally, a distance between a side of the heating layer 230 adjacent to the bottom end surface 215 and the bottom end surface is in a range of 4 mm to 10 mm. Further, a distance between a side of the heating layer 230 adjacent to the bottom end surface 215 and the bottom end surface is in a range of 5 mm to 8 mm.

In some embodiments, the heating element 20 further includes a covering layer 260 covering the heating layer 230. Optionally, Optionally, the covering layer 260 is a ceramic layer. In an example, the covering layer 260 is a glass ceramic layer. Certainly, in other embodiments, a material of the covering layer 260 is not limited to glass ceramic. In the illustrated embodiment, the covering layer 260 covers the entire heating layer 230 and covers a part of the first conductive layer 241. In this case, the covering layer 260 can also protect the part of the first conductive layer 241 covered by the covering layer.

A selection of the material of the conductive substrate 210, the insulating layer 220, the heating layer 230, the first conductive layer 241, and the covering layer 260 in the heating element is the same as that of the conductive substrate 110, the insulating layer 120, and the heating layer 130, the first conductive layer 141, and the covering layer 160 in the heating element 10. Details are not described herein again.

The heating element is provided with an insulating layer and a heating layer on the conductive substrate, and a first conductive member is provided on the insulating layer and a second conductive member is provided on the conductive substrate, so that the first conductive member, the heating layer, the conductive substrate, and the second conductive member can form a circuit with the power supply when the power supply is turned on. In this way, the whole surface heating of the heating layer is realized, the area of the high temperature area is increased, the maximum temperature of the heating element is reduced, the energy consumption is reduced, and the heating uniformity of the heating layer is improved. Further, when the heating element is applied to the heat-not-burn cigarette device, the uniformity of the aroma and the taste emitted by the cigarette can be improved.

Moreover, a heating device is further provided according to at least one embodiment of the present disclosure. The heating device includes a mounting base as described above and a heating element according to any of the foregoing embodiments mounted to the mounting base. Certainly, in some embodiments, the heating device further includes a housing. The heating element and the mounting base are accommodated in the housing. In a specific example, the heating device is a heat-not-burn cigarette device, which is an important part of the heat-not-burn cigarette.

The heating device includes the heating element, and has advantages of uniform heating and low energy consumption.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A heating element, comprising:
a conductive substrate;
an insulating layer located on the conductive substrate;
a heating layer located on the insulating layer and electrically connected to the conductive substrate;
a first conductive member located on the insulating layer and electrically connected to the heating layer; and
a second conductive member located on the conductive substrate and electrically connected to the conductive substrate.

2. The heating element of claim 1, wherein a resistance of the conductive substrate is in a range of 0.6Ω to 2Ω.

3. The heating element of claim 1, wherein the conductive substrate comprises at least one of a metal substrate, a semiconductor substrate, and a conductive ceramic substrate, and/or
wherein a material of the heating layer comprises at least one of titanium, tin oxide, and nickel.

4. The heating element of claim 1, further comprising:
a covering layer covering the heating layer; and/or
a protective layer covering at least part of the conductive substrate.

5. The heating element of claim 4, wherein the covering layer and/or the protective layer comprises a ceramic layer.

6. A heat-not-burn cigarette, comprising:
the heating element of claim 1.

7. A heating device, comprising:
the heating element of claim 1; and
a mounting base,
wherein the heating element is mounted to the mounting base.

8. The heating device of claim 7, wherein the heating device comprises a heat-not-burn cigarette device.

9. A heat-not-burn cigarette, comprising:
the heating device of claim 7.

10. A heating element, comprising:
a conductive substrate;
an insulating layer located on the conductive substrate;
a heating layer located on the insulating layer and electrically connected to the conductive substrate;
a first conductive member located on the insulating layer and electrically connected to the heating layer; and
a second conductive member located on the conductive substrate and electrically connected to the conductive substrate,
wherein the conductive substrate is in a shape of a sheet,
wherein the conductive substrate has a first surface, a second surface opposite the first surface, a first end, and a second end opposite the first end,
wherein the insulating layer is located on the first surface and covers a part of the first surface,
wherein one part of the heating layer is attached to a part of the first surface not covered by the insulating layer, the one part of the heating layer is farther away from the first end of the conductive substrate than an other part of the heating layer, the other part of the heating layer is attached to the insulating layer and is electrically connected to the first conductive member, and the first conductive member is adjacent to the first end, and
wherein the second conductive member is located on the second surface and adjacent to the first end.

11. The heating element of claim 10, wherein the conductive substrate comprises a strip-shaped sheet structure,
wherein the first conductive member comprises a first conductive layer, and the first conductive layer is located on the insulating layer and is electrically connected to the heating layer, and
wherein the second conductive member comprises a second conductive layer, the second conductive layer is located on the second surface and adjacent to the first end, and the second conductive layer is electrically connected to the conductive substrate.

12. The heating element of claim 11, wherein a width of the first conductive layer is 1 mm to 5 mm narrower than a width of the conductive substrate, and/or
wherein a length of the first conductive layer in a length direction of the conductive substrate is in a range of 5 mm to 10 mm, and/or
wherein the first conductive layer comprises gold and/or gold alloy and/or silver and/or silver alloy.

13. The heating element of claim 12, wherein a width of the second conductive layer is 1 mm to 5 mm narrower than the width of the conductive substrate, and/or
wherein the second conductive layer comprises gold and/or gold alloy and/or silver and/or silver alloy, and/or
wherein a length of the second conductive layer in the length direction of the conductive substrate is in a range of 5 mm to 10 mm.

14. A heating element, comprising:
a conductive substrate;
an insulating layer located on the conductive substrate;
a heating layer located on the insulating layer and electrically connected to the conductive substrate;
a first conductive member located on the insulating layer and electrically connected to the heating layer; and
a second conductive member located on the conductive substrate and electrically connected to the conductive substrate,
wherein the conductive substrate is in a shape of a column having a tip,
wherein the conductive substrate has a bottom end surface and an outer circumferential surface,
wherein the insulating layer is located on the outer circumferential surface and covers a part of the outer circumferential surface,
wherein one part of the heating layer is connected to a part of the outer circumferential surface not covered by the insulating layer,
wherein the one part of the heating layer is farther away from the bottom end surface than an other part of the heating layer,
wherein the other part of the heating layer is located on the insulating layer and is electrically connected to the first conductive member,
wherein the first conductive member is adjacent to the bottom end surface, and wherein the second conductive member is located on the outer circumferential surface and adjacent to the bottom end surface.

15. The heating element of claim 14, wherein the first conductive member comprises a first conductive layer and a first snap ring, the first conductive layer being located on the insulating layer and is electrically connected to the heating layer, wherein the first snap ring is sleeved on the first conductive layer and is electrically connected to the first conductive layer, wherein the second conductive member comprises a second snap ring, and wherein the second snap ring is fixed to the outer circumferential surface and is electrically connected to the conductive substrate.

16. The heating element of claim 15, wherein a length of the first conductive layer in a length direction of the conductive substrate is in a range of 2 mm to 3 mm, and/or wherein a distance between one side of the first conductive layer adjacent to the bottom end surface and the bottom end surface is in a range of 2 mm to 3 mm, and/or wherein the first conductive layer comprises gold and/or gold alloy and/or silver and/or silver, and/or wherein a distance between one side of the insulating layer adjacent to the bottom end surface and the bottom end surface is in a range of 2 mm to 5 mm, and/or wherein a distance between one side of the heating layer adjacent to the bottom end surface and the bottom end surface is in a range of 4 mm to 10 mm.

* * * * *